(No Model.) 7 Sheets—Sheet 1.
G., J. G. & M. O. REHFUSS.
BARREL STAVE CUTTING MACHINE.
No. 384,786. Patented June 19, 1888.
FIG. 1. A.
FIG. 2. A.
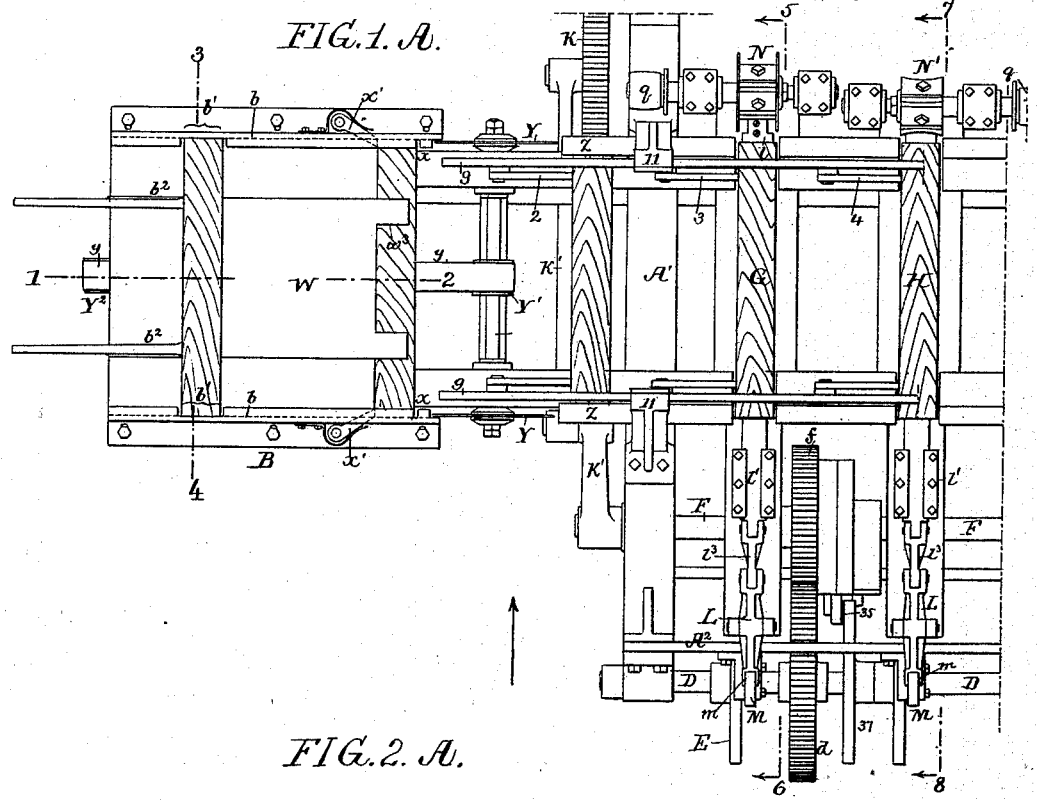
Witnesses
David L. Williams
William D. Conner
Inventors:
George Rehfuss,
John G. Rehfuss & M. O. Rehfuss.
by their Attorneys
Howson and Sons

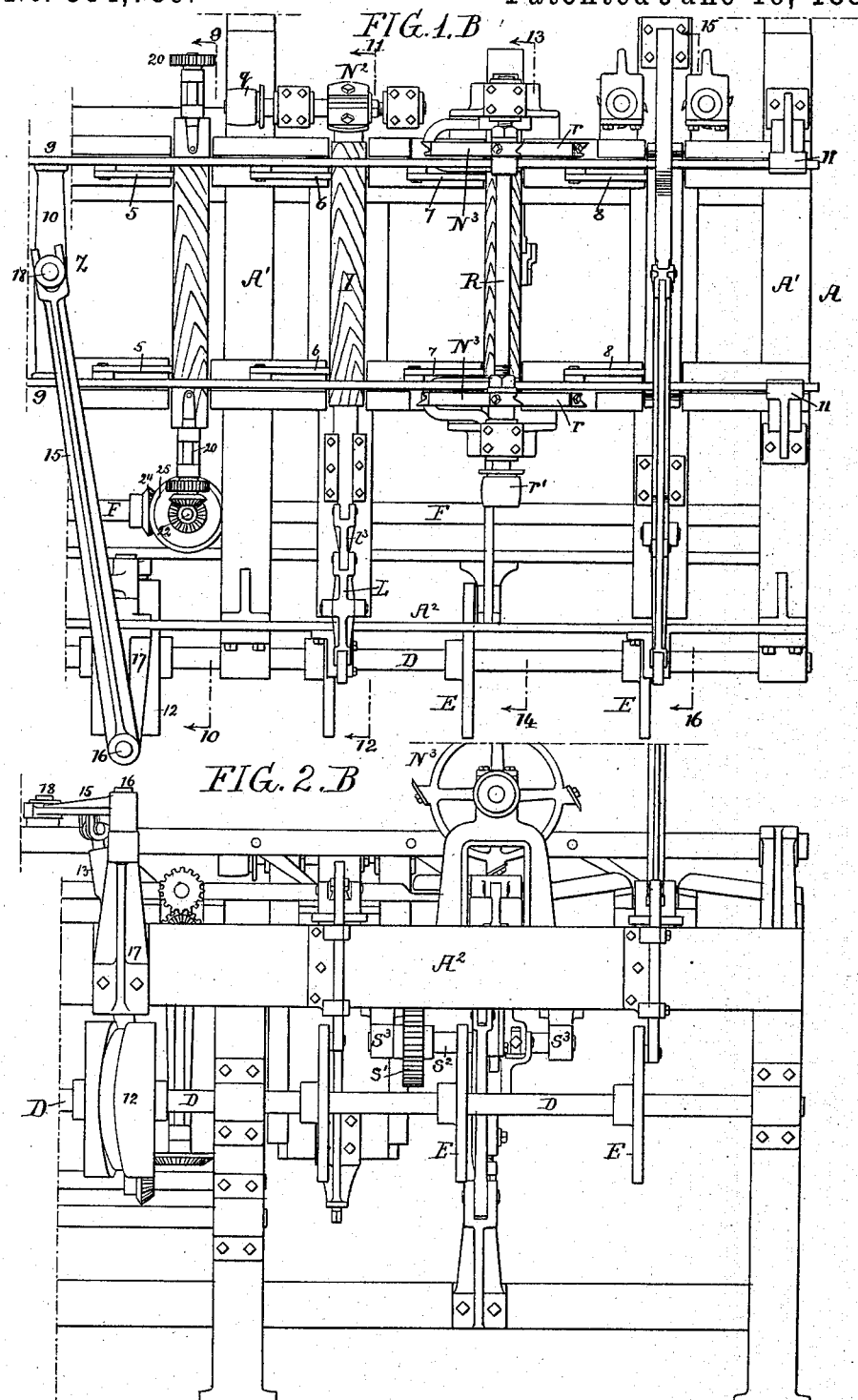

(No Model.) 7 Sheets—Sheet 3.
G., J. G. & M. O. REHFUSS.
BARREL STAVE CUTTING MACHINE.
No. 384,786. Patented June 19, 1888.
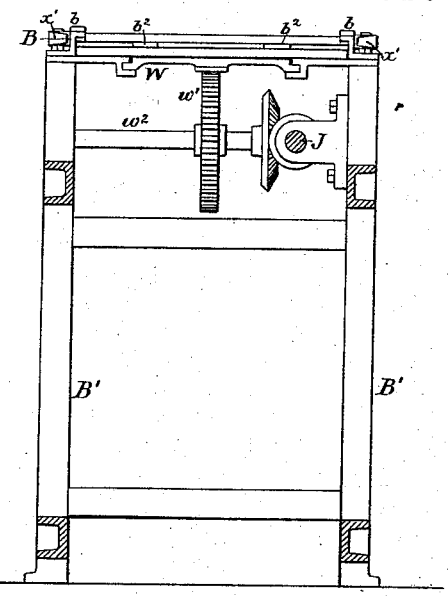
FIG. 4.
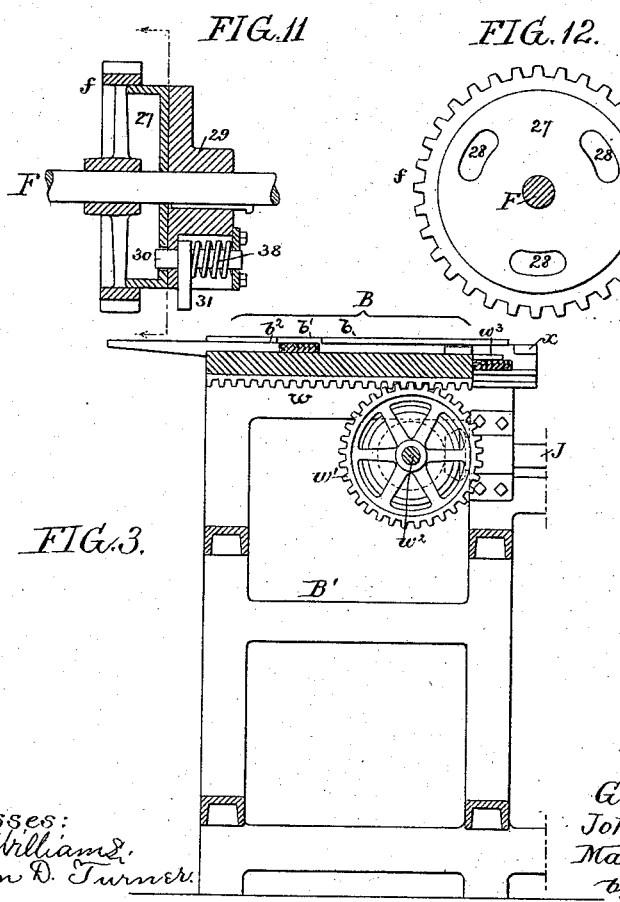
FIG. 11. FIG. 12.
FIG. 3.
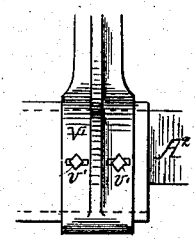
FIG. 26.
Witnesses:
David L. Williams
Hamilton D. Turner
Inventors:
George Rehfuss,
John G. Rehfuss &
Martin O. Rehfuss
by their Attorneys
Howson and Sons (No Model.) 7 Sheets—Sheet 4.

G., J. G. & M. O. REHFUSS.
BARREL STAVE CUTTING MACHINE.

No. 384,786. Patented June 19, 1888.

Witnesses
Aug. Bartoff
David S. Williams

Inventors
G. Rehfuss, J. G. Rehfuss & M. O. Rehfuss
by their Attorneys
Howson and Sons (No Model.) 7 Sheets—Sheet 5.

G., J. G. & M. O. REHFUSS.
BARREL STAVE CUTTING MACHINE.

No. 384,786. Patented June 19, 1888.

Witnesses
Inventors:

(No Model.) 7 Sheets—Sheet 6.

G., J. G. & M. O. REHFUSS.
BARREL STAVE CUTTING MACHINE.

No. 384,786. Patented June 19, 1888.

(No Model.) 7 Sheets—Sheet 7.

G., J. G. & M. O. REHFUSS.
BARREL STAVE CUTTING MACHINE.

No. 384,786. Patented June 19, 1888.

Witnesses:
David L. Williams,
Hamilton D. Turner,

Inventors:
N. G. Rehfuss,
J. G. Rehfuss &
M. O. Rehfuss,
by their Attorneys
Howson and Son

United States Patent Office.

GEORGE REHFUSS, JOHN GEORGE REHFUSS, AND MARTIN O. REHFUSS, OF PHILADELPHIA, PENNSYLVANIA, ASSIGNORS TO THE AMERICAN BARREL AND STAVE COMPANY, OF CAMDEN, NEW JERSEY.

BARREL-STAVE-CUTTING MACHINE.

SPECIFICATION forming part of Letters Patent No. 384,786, dated June 19, 1888.

Application filed February 16, 1887. Serial No. 227,781. (No model.)

*To all whom it may concern:*

Be it known that we, GEORGE REHFUSS, JOHN GEORGE REHFUSS, and MARTIN O. REHFUSS, all citizens of the United States, and residents of Philadelphia, Pennsylvania, have invented certain Improvements in Barrel-Stave-Cutting Machines, of which the following is a specification.

Our invention consists of improvements in that class of barrel-stave-cutting machines in which the stave is completed in its passage of the machine, our invention comprising certain details of construction fully described and specifically claimed hereinafter.

Figure 5:
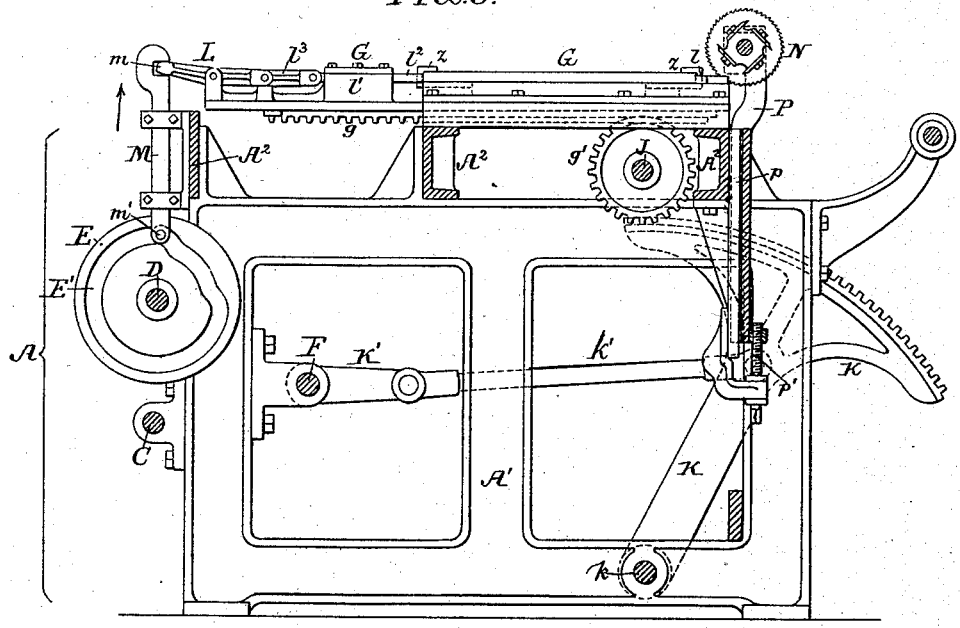
Figure 6:
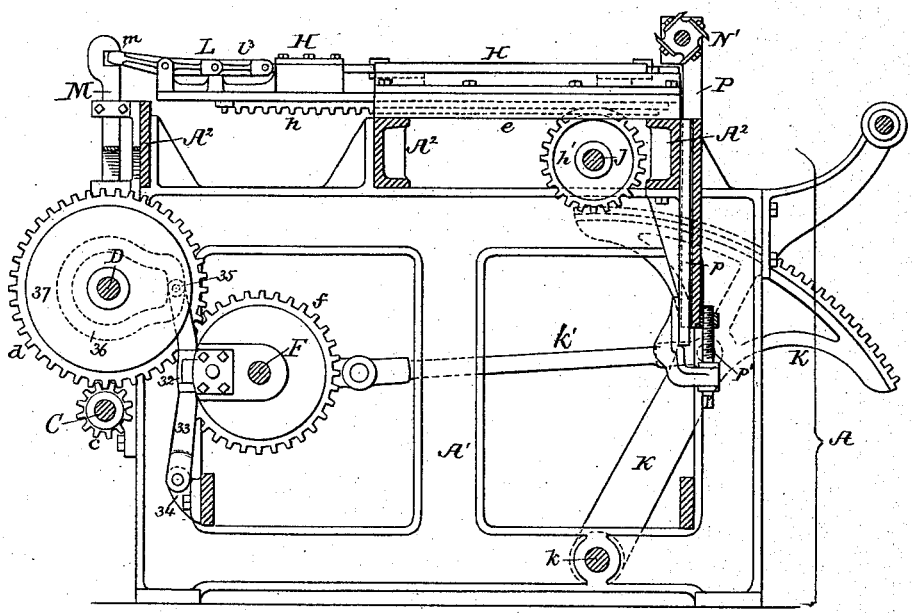
Figure 7:
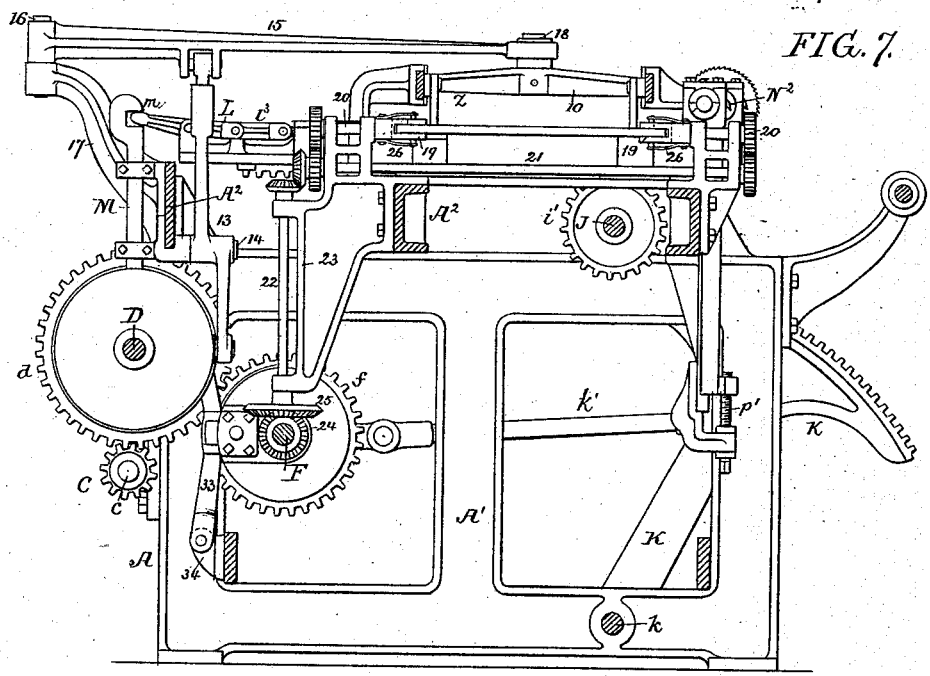
Figure 8:
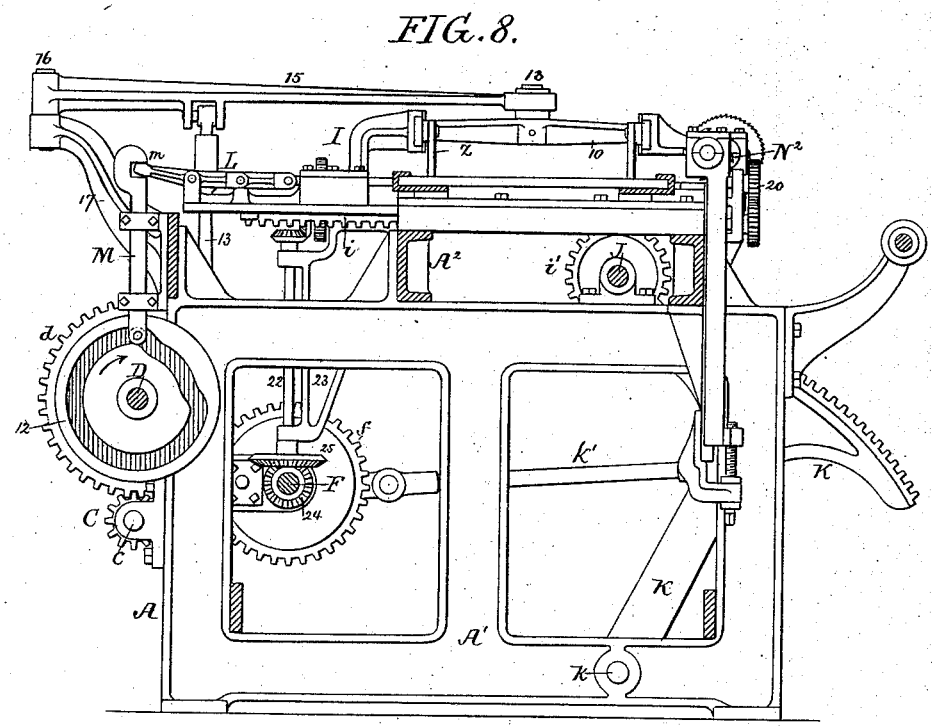
Figure 10:
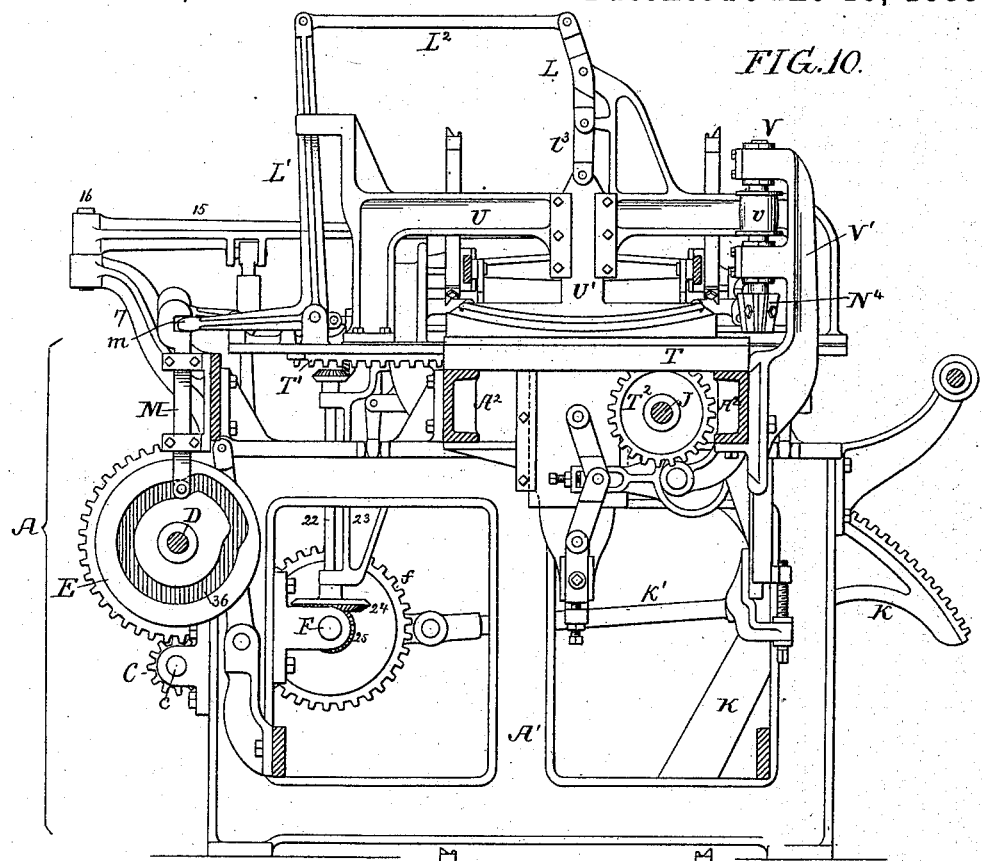
Figure 9:
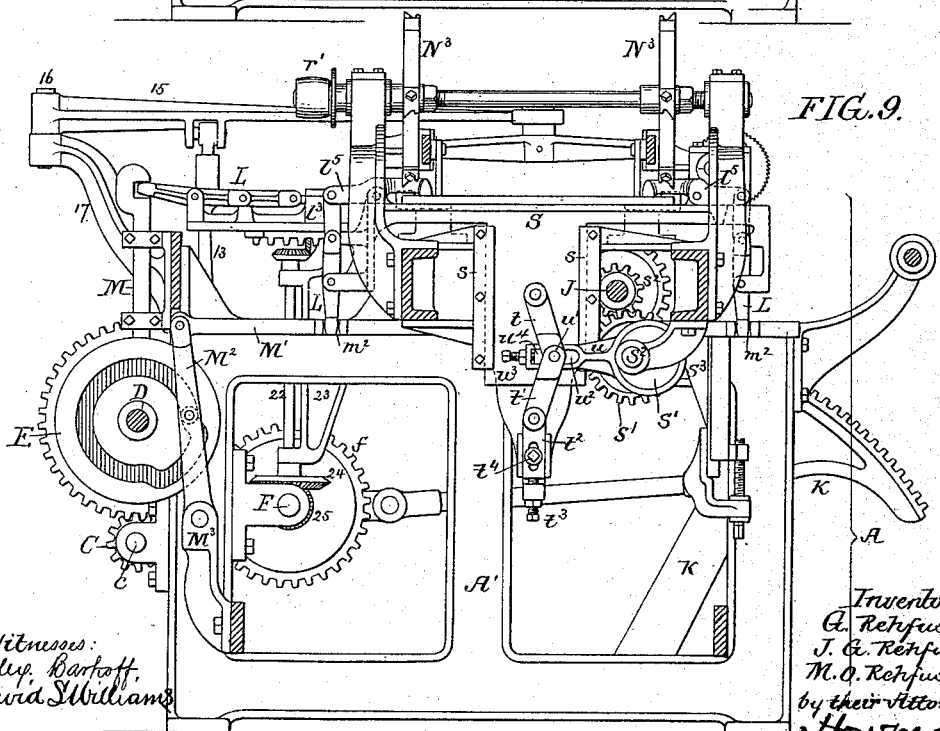
Figure 13:
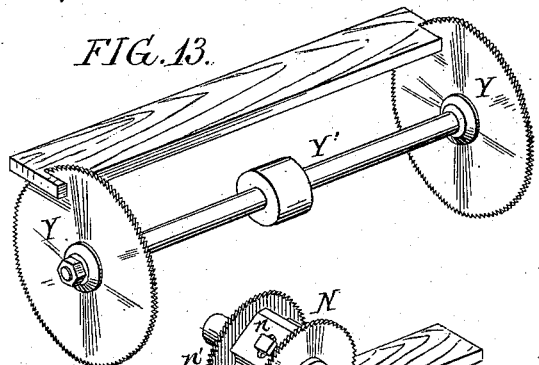

In the accompanying drawings, Figure 1$^A$ is a plan view of one half of the machine. Fig. 1$^B$ is a plan view of the other half of the same. Fig. 2$^A$ is a side view, looking in the direction of the arrow, of that portion of the machine shown in Fig. 1$^A$; Fig. 2$^B$, a like view of that portion of the machine shown in Fig. 1$^B$. Fig. 3 is a longitudinal section on the line 1 2, Fig. 1$^A$. Fig. 4 is a transverse section on the line 3 4, Fig. 1$^A$. Fig. 5 is a transverse section on the line 5 6, Fig. 1$^A$. Fig. 6 is a transverse section on the line 7 8, Fig. 1$^A$. Fig. 7 is a transverse section on the line 9 10, Fig. 1$^B$. Fig. 8 is a transverse section on the line 11 12, Fig. 1$^B$. Fig. 9 is a transverse section on the line 13 14, Fig. 1$^B$. Fig. 10 is a transverse section on the line 15 16, Fig. 1$^B$. Figs. 11 and 12 are detached views of a clutching device forming part of the machine; and Figs. 13 to 25 are diagrams illustrating the successive operations resorted to in forming a stave in our improved machine. Fig. 26 is a view of a detail of the machine.

We have thought it best to illustrate on as large a scale as possible the full plan and side views of the machine, and have therefore placed these views on separate sheets, one-half of the machine being shown on each sheet, and one half being lettered A and the other half B, as described above.

A is the frame of the machine, composed of a series of frames, A', and longitudinal bars or girders A$^2$, which carry the different parts of the machine referred to hereinafter.

At the front end of the machine is a table, B, on which the stave-blanks are supported prior to being fed to the cutters. This table B is supported by suitable frames, B', secured to the main frame A of the machine, as fully shown in Figs. 1$^A$ and 2$^A$.

C is the driving-shaft of the machine, which has a pinion, $c$, gearing into a wheel, $d$, fast on a shaft, D, which we will term the "cam-shaft," as on it are secured the cams E for operating the stave-retaining devices described hereinafter. The gear-wheel $d$ meshes with a wheel, $f$, loose on a shaft, F, and adapted to be thrown into and out of gear with the shaft by mechanism fully described hereinafter.

Traveling in suitable guides, $e$, which are secured to the longitudinal bars A$^2$, are carriages G, H, and I, these carriages being provided with racks $g$, $h$, and $i$ on their under sides, which mesh with pinion-wheels $g'$, $h'$, and $i'$ on a longitudinal shaft, J, the latter being also provided with a pinion-wheel, $j$, which gears with a segment, K, pivoted at $k$ to the frame of the machine. This segment is connected to a crank, K', on the shaft F by a connecting-rod, $k'$, attached to the segment at such a distance from the point $k$ as to give said segment the required throw during one revolution of the shaft F. (See Fig. 5.)

It will thus be seen that as the shaft F revolves, the segment will be vibrated and the carriages G, H, and I will be simultaneously reciprocated in a direction transversely to the length of the machine.

Each carriage is provided with a stave-blank-locking device, and when the stave is placed on the carriage it is automatically locked thereto and held firmly while it passes under the cutter-heads, as described hereinafter.

The stave-holders on the carriages G, H, and I are similar in every respect, and we will only describe the stave-holder on the carriage G, reference being had to Fig. 5.

At one end of the carriage is a shoulder, $l$, against which the stave bears, and at the other end of the carriage are guideways $l'$, in which slides a bar, $l^2$, connected at one end to a link, $l^3$, which in turn is connected to one arm of a lever, L, pivoted to the carriage G, the other arm of this lever being adapted to a recess, $m$, in a vertically-guided bar, M, the guides for which are firmly secured to the frame of the machine.

When the carriage moves forward, the end of the lever L leaves the recess $m$ in the bar M, and when the carriage returns, the lever again enters the recess in the bar, as will be fully understood by referring to the drawings. At the lower end of this bar M is a friction-wheel, $m'$, adapted to a cam-slot, E', of a cam, E, on the shaft D, so that as said shaft revolves, the bar M will be moved in the direction of its arrow, Fig. 5, which will push the clamp $l^2$ against one end of the stave and force the opposite end of the same against the shoulder $l$, the knee-joint formed by the lever L and link $l^3$ passing the center, as shown in Fig. 5, so as to firmly lock the stave-blank to the carriage.

After the stave has been cut by passing under the cutter, the bar M will be drawn down by the cam, thus raising the toggle and releasing the stave-blank, which will be removed and a new blank put in its place.

N, N', $N^2$, $N^3$, and $N^4$ are the cutters which act upon the stave. The cutters N N' $N^2$ are each mounted on independent bearings P, which are guided in V-shaped ways $p$, and are adjusted to or from the path of the carriage by a set-screw, $p'$. Each cutter is provided with a driving-pulley, $q$, to which is adapted a belt from a pulley as a suitable counter-shaft.

Figure 14:
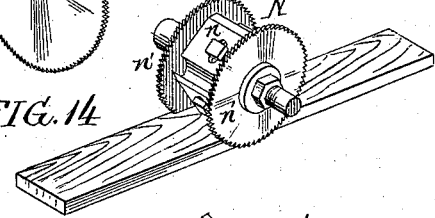
Figure 16:
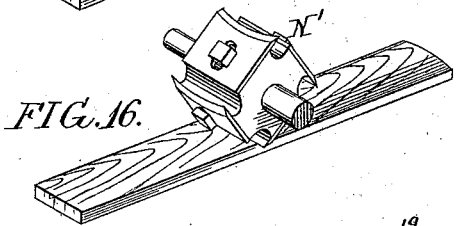
Figure 18:
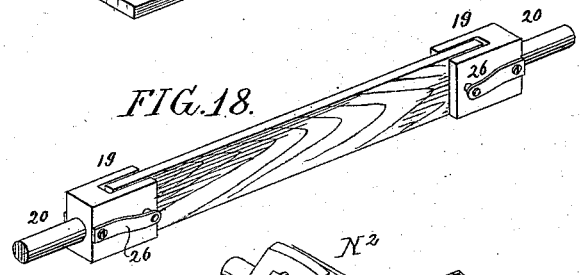
Figure 15:
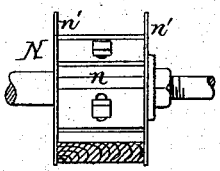
Figure 17:
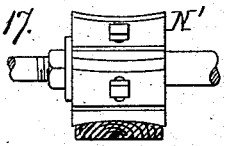
Figure 19:
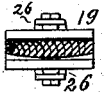

The cutter N is provided with suitable bits, $n$, which roughly plane the side of the stave-blank, and is also provided with saws $n'$ $n'$ at each side of the planer $n$, these saws serving to cut the blank to the right width, as will be seen in the diagrams, Figs. 14 and 15.

The blades of the cutter N' are concave, and will consequently form a convex face on the blank, the radius of the concave being regulated by the diameter of the barrel which is to be formed from the cut staves. (See Figs. 16 and 17.)

Figure 20:
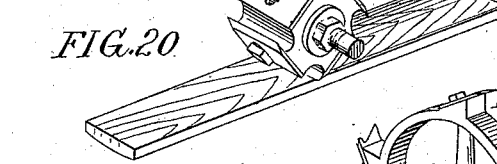
Figure 21:
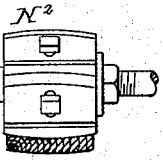

The cutter $N^2$ is convex, and consequently will form a concave face on the stave-blank, the blank being turned over after leaving the cutter N' and before reaching the cutter $N^2$, Figs. 20 and 21.

Figure 22:
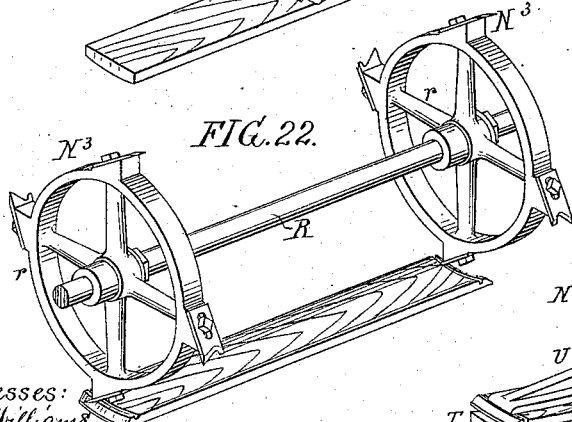
Figure 23:
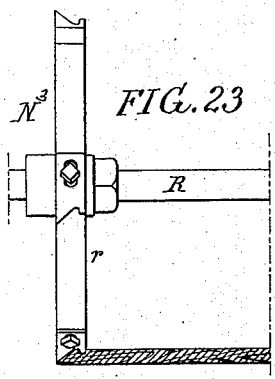

The three cutters above referred to cut the stave to the required width and impart to it the desired concave and convex surfaces, and the cutters $N^3$, Figs. 22 and 23, chamfer and croze the staves for the reception of the heads of the barrels.

The cutter-bits $N^3$ are mounted on wheels or circular frames $r$ $r$, as shown in Fig. 22, and said frames are fast on a transverse shaft, R, which is driven by a belt passing over a pulley, $r'$, at one side, as shown in Fig. 1$^B$.

The stave, instead of being passed under the cutters $N^3$ by a transversely-moving carriage, as in the other mechanisms, is moved vertically from and toward the cutters, as we will now describe, reference being had to Fig. 9. The stave-blank is passed onto a platform, S, which is adapted to slide in guides $s$ $s$ on the frame, and is moved up and down by means of an eccentric, S', on a shaft, $S^2$, having its bearings in hangers $S^3$ on the frame of the machine. This shaft is geared to the shaft J by gear-wheels $s'$ $s^2$, so that it will rotate once while the shaft J is rotating twice.

The eccentric S' raises and lowers the platform S through the medium of a toggle-joint composed of the two links $t$ $t'$, the link $t$ being secured to the platform S, and the link $t'$ being secured to a bar, $t^2$, adjustable on the frame of the machine, by means of a set-screw, $t^3$, a set-screw, $t^4$, locking the bar after adjustment. The eccentric-rod $u$ is connected to the links $t$ $t'$ at the point $u'$, so that as the eccentric revolves, the platform S will be raised and lowered. A block, $u^4$, carries the pivot-pin $u'$, and is adapted to a slot, $u^2$, in the connecting-rod $u$, and is adjustable therein by means of a set-screw, $u^3$, swiveled to the block and passing through a threaded orifice in the rod, so that a certain amount of the movement of the eccentric S' is lost, this amount depending upon the adjustment of the block $u^4$ in the slot. The position of the platform S can thus be regulated by the adjustment of either the set-screw $u^3$ or the set-screw $t^3$, or both, as will be readily understood.

The stave-blank is clamped to the platform by devices similar to those above described, the only difference being that the devices are duplicated, one set being used at each end of the stave, and in place of the sliding bar we use pivoted levers $l^5$. One arm of each lever is connected to a link, $l^3$, and the other arm is U-shaped in order to pass around the cutters $N^3$ and clamp the blank between the cutters. In place of the vertical bar M, a transverse bar, M', is used, which has openings $m^2$ $m^2$ for the reception of the ends of the levers L, and is operated by a cam, E, through the medium of a lever, $M^2$, connected to the bar M' and pivoted to a bracket, $M^3$, on the frame of the machine.

Figure 25:
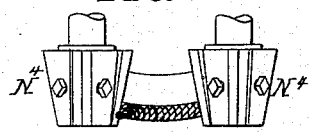
Figure 24:
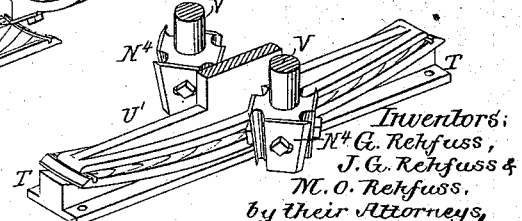

We will now describe the devices for beveling the edges of the stave, reference being had to Figs. 10, 24, and 25.

T is a carriage having a concave top, and having on its under side a rack, T', which gears with a pinion-wheel, $T^2$, on the shaft J. Sliding in a frame, U, on this carriage is a clamp, U', with convex under face, the segment being of the same radius as that of the concave surface of the carriage T. This clamp bends the stave-blank, as shown in Figs. 10 and 24, and secures it in its bent position until the carriage has passed between the cutters $N^4$. The devices for securing this clamp are similar to the devices above described for securing the blanks on each carriage, with the exception that the toggle-joint is vertical and that the lever L is connected to one arm of a bell-crank lever, L', by a rod, $L^2$, the other arm of this lever L' being adapted to the recess $m$ in a vertical bar, M, under the control of the cam E. The cutters in this instance are cone-shaped, and are secured to vertical shafts V, having their bearings in standards V', longitudinally adjustable on the machine by means of set-screws $v'$, passing through oblong slots in the standards, in order to cut different-width staves, as shown in Fig. 26. These cutters are driven by belts passing around pulleys $v$.

We will now describe the feed-table and the machine for feeding the stave-blanks from one cutter to another, reference being had to Figs. 1$^A$, 2$^A$, 3, and 4.

As previously mentioned, B is the feed-table, which consists, essentially, of two bars, $b$ $b$, slotted at $b'$ to allow a stave to drop in front of a pusher, $b^2$. This pusher is attached to a movable platform, W, having a rack, $w$, which gears with a pinion, $w'$, on a transverse shaft, $w^2$, the latter being driven by bevel-gears from the shaft J of the machine. When the machine is in motion, the platform W is reciprocated, carrying the stave-blank with it on the forward movement, until said blank strikes a projection, $x$, on the frame, the platform being then retracted, but the stave-blank being prevented from receding with the platform, two spring-catches, $x'$ $x'$, one on each side of the frame, engaging with the stave and retaining it in the position to which it has been moved by the pusher. When the platform has receded to its full extent, the stave drops clear of the platform W, and on the next forward movement of the platform fingers $w^3$ pass over the stave-blank and hold it firmly in position, so as to prevent it from rising when the blank is fed against the saws Y Y, which are mounted on a spindle, Y$'$, and serve to cut the blank to the required length. The saw-spindle Y$'$ is driven from a counter-shaft, Y$^2$, by a belt, $y$, Fig. 2$^A$. After the stave has been sawed to the proper length the platform W pushes it into suitable grooves, $z$ $z$, Figs. 1$^A$ and 5, and the stave there comes into the path of feed-fingers on a reciprocating frame, Z, composed of two side bars, 9 9, and a cross-bar, 10, the bars 9 9 being guided at each end in suitable guide-boxes, 11, secured to the frame of the machine, and being reciprocated by means of a cam, 12, on the shaft D, Figs. 1$^B$, 2$^B$, and 7, this cam acting through the medium of a lever, 13, which is pivoted at 14 to the frame of the machine, one arm of the lever having a roller which travels in the scroll of the cam 12, and the other arm of the lever being connected by a universal joint to an arm, 15, which is pivoted at 16 to a bracket, 17, on the frame of the machine, the inner end of the arm 15 forming a yoke, which receives a pin, 18, on the cross-bar 10 of the frame Z. The frame Z thus has an intermittent longitudinal reciprocating movement, and is provided with fingers 2, 3, 4, 5, 6, 7, and 8, pivoted to each side frame, 9. Each pair of these fingers carries a stave-blank from one set of cutters to another. Consequently, when the stave-blank has been pushed by the platform W into the path of the fingers 2, they in turn push it onto the carriage G, and it is then clamped to the carriage and passed under the cutters N, the fingers 2 returning to their original position. On the return of the carriage G the stave-blank is disconnected therefrom, and as the fingers 3 have passed back of the stave-blank said fingers will on the next forward movement of the frame Z push the blank onto the carriage H, to which it is clamped and by which it is passed under the cutters N$'$. When the frame Z and carriage H have again returned to their normal positions, the fingers 4 are back of the stave-blank, and on the next forward movement of the frame Z the blank is pushed between two jaws, 19, Figs. 7, 18, and 19. Each of these jaws is mounted on a shaft, 20, at the side of the machine, said shafts being geared together by means of suitable gear-wheels and a shaft, 21, the latter being geared by bevel-wheels to a vertical shaft, 22, turning in suitable bearings, 23, on the frame of the machine. This shaft 22 derives its motion from the shaft F through the medium of bevel-gears 24 25, Fig. 7, and the shaft F is, as before remarked, intermittently driven. After the stave-blank has been inserted in the jaws 19, therefore, it is turned by the above-described mechanism to the extent of one-half of a revolution, in order that the under side of the blank may be properly presented to the cutters N$^2$, spring friction-pins 26 on the jaws 19 keeping the blank steady while it is being turned. After the stave-blank has been turned the fingers 5 on the frame Z drop back of it, and on the next forward movement of the frame Z push the blank into position on the carriage I, to which it is clamped, and then passed under the cutter N$^2$. After the stave has been released by the clamping device on the carriage I, it is pushed onto the platform S by the fingers 6 and there clamped and raised by the mechanism previously described until it comes in contact with the cutters N$^3$, by which the blank is chamfered and crozed, as in Figs. 22 and 23, the platform being then depressed, the fingers 7 drawn back of the stave, and the latter released from the control of the clamps on the platform S, so that the fingers 7 may push the stave blank into position on the carriage T. The clamp U$'$ is then forced down onto the stave-blank so as to bend it, as shown in Figs. 10 and 24, after which the carriage is passed between the two cutters N$^4$, which bevel the edges of the stave to the radial line required. On the return of the carriage T to its normal position, the clamp U$'$ is raised, and the fingers 8 push the blank out clear of the machine.

It must be borne in mind that each of the cutters or sets of cutters in the machine is operating on a stave-blank at the same time, so that eight stave-blanks, in different stages of manufacture, are in the machine at one time.

We will now describe the clutch for throwing the shaft F in and out of gear with the shaft D, reference being had to Figs. 6, 11, and 12.

On the loose gear-wheel $f$ is a disk, 27, having three orifices, 28; and on the shaft F, and secured thereto, is a disk, 29, provided with a pin, 30, acted on by a spring, 38, and having an arm, 31, to engage with an inclined projection, 32, Fig. 2ᴬ, on an arm, 33, pivoted to a bracket, 34, on the frame of the machine, the end of this arm having a pin, 35, which is adapted to a cam groove, 36, in a disk, 37, on the shaft D. The spring 38 forces the pin 30 into one or other of the orifices 28 of the disk 27; but at each revolution of the shafts D and F the pin is retracted by the action of the projection 32 of the arm 33 on the arm 31 of said pin, and the motion of the said shaft F will hence be stopped until another of the orifices 28 is brought into line with the pin 30, and as the arm 33 has by this time been retracted, the pin will enter the orifice and the shaft will be rotated until the pin is again forced out by the projection 32 of the lever 33, as will be understood on reference to Fig. 6. The shaft F will thus have an intermittent movement, and the devices for locking the stave-blank in position on each of the carriages and on the platform T will be actuated before the carriage or platform is moved, and the said devices will be kept locked until the movement of the carriages and platform is completed.

We claim as our invention—

1. The combination of a series of stave-cutters, feeders for the staves, and reversible stave-holders located between successive cutters, by which the staves are reversed side for side between the successive cutters, all substantially as and for the purpose set forth.

2. The combination of a series of cutters, a series of transverse reciprocating stave-holding carriages, feeding devices for directing the staves from one carriage to another, and clamps on each carriage for automatically locking and releasing the staves.

3. The combination, in a stave-cutting machine, of the traveling carriage having a fixed jaw at one end and a movable jaw at the opposite end, a link and lever, forming a toggle, connected to said movable jaw, with a cam moving said lever to lock the blank to or release it from the carriage, all substantially as described.

4. The combination, in a stave-cutting machine, of the traveling carriage having a fixed and a movable jaw, a link and lever, forming a toggle, and a sliding bar and cam for operating said toggle, all substantially as described.

5. The combination, in a stave-cutting machine, of two cutters and platforms therefor with a pair of stave-reversing jaws situated between the platforms and adapted to grasp only the ends of the staves, with devices for feeding the staves into and out of the jaws, substantially as and for the purpose described.

6. The combination of a pair of jaws geared together with devices for turning the jaws and friction-pins for retaining a stave-blank when fed into the jaws, substantially as specified.

7. The combination, in a stave-cutting machine, of concave and convex cutters and reciprocated carriages therefor, stave-feeders, stave-turning jaws between said concave and convex cutters, and devices for simultaneously operating said carriages, stave-feeders, and turning-jaws, substantially as set forth.

8. The combination, in a stave-cutting machine, of chamfering and crozing cutters, with a platform movable to or from the said cutters, with automatic locks for the stave-blank, and with a reciprocating feeder to carry a stave onto the platform prior to cutting and remove it after cutting, the whole being timed to work automatically, substantially as set forth.

9. The combination of the chamfering and crozing cutters with a sliding platform, a driving-shaft, an eccentric thereon having a slotted rod, and a toggle-joint connection between the eccentric-rod and the platform, a block carrying the pivot of the toggle being adapted to the slot in said rod, all substantially as specified.

10. The combination of chamfering and crozing cutters, a sliding stave-carrying platform, an adjustable bar, $t^2$, toggle-levers connecting the platform to the bar, and devices for operating said toggle-levers to move the platform toward and from the cutters, substantially as specified.

11. The combination, in a stave-cutting machine, of stave-cutters and stave-holding carriages on which the staves rest, a frame adapted to guides on the machine and having fingers adapted to push the stave-blanks from one carriage to another, and devices for reciprocating the frame, substantially as described.

12. The combination of the cutters, traveling carriages, each provided with a rack, a shaft having pinions gearing into the racks of the carriages, a segmental rack geared to a pinion on said shaft, with devices for intermittently rotating said segmental rack, all substantially as set forth.

In testimony whereof we have signed our names to this specification in the presence of two subscribing witnesses.

GEO. REHFUSS.
  JOHN GEORGE REHFUSS.
  MARTIN O. REHFUSS.

Witnesses:
  JOS. ZIEGLER,
  HARRY SMITH.